US012547861B2

(12) United States Patent
Arlazarov et al.

(10) Patent No.: US 12,547,861 B2
(45) Date of Patent: Feb. 10, 2026

(54) SCANNER WITH MULTISPECTRAL AUTHENTICATION SYSTEM (71) Applicant: Smart Engines Service, LLC, Moscow (RU)

(72) Inventors: Vladimir Viktorovich Arlazarov, Moscow (RU); Aleksej Valeryevich Bogomolov, Moscow (RU); Dmitry Petrovich Nikolaev, Moscow (RU); Oleg Anatolyevitch Slavin, Moscow (RU); Sergey Aleksandrovich Usilin, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 0 days.

(21) Appl. No.: 18/603,072

(22) Filed: Mar. 12, 2024

(65) Prior Publication Data

US 2025/0292043 A1    Sep. 18, 2025

(51) Int. Cl.
*G06K 7/14* (2006.01)
*G06K 19/14* (2006.01)
*H04N 23/56* (2023.01)

(52) U.S. Cl.
CPC .............. *G06K 7/14* (2013.01); *G06K 19/145* (2013.01); *H04N 23/56* (2023.01)

(58) Field of Classification Search
CPC ......... G06K 7/14; G06K 19/145; H04N 23/56

USPC .......................................................... 235/454
See application file for complete search history.

(56) References Cited

U.S. PATENT DOCUMENTS

| 2013/0135859 | A1* | 5/2013 | Inoue ................. H04N 1/02855 |
| | | | 362/235 |
| 2019/0325712 | A1* | 10/2019 | Nemati ................ G06Q 20/208 |
| 2021/0004581 | A1* | 1/2021 | Bathory-Frota ..... G06V 30/413 |
| 2021/0064303 | A1* | 3/2021 | Caliendo, Jr. ......... G06F 3/1255 |

FOREIGN PATENT DOCUMENTS

| RU | 127977 U1 | 5/2013 |
| RU | 2803109 C1 | 9/2023 |
| RU | 2805369 C1 | 10/2023 |

* cited by examiner

*Primary Examiner* — Michael G Lee
*Assistant Examiner* — David Tardif
(74) *Attorney, Agent, or Firm* — Osha Bergman Watanabe & Burton LLP (57) ABSTRACT

Conventional scanners are incapable of reading holographic images, optically variable ink, and/or optically variable devices. Accordingly, an embodiment of a scanner is disclosed that utilizes a frame underlying a glass pane on which an identity document, such as a passport and visa document, is placed. The frame comprises a frame body with a plurality of embedded light emitting diodes (LEDs). A microprocessor is configured to regulate an intensity of the LEDs to vary the intensity of the LEDs as a camera of the scanner captures the image data. This enables the imaging of holographic images, optically variable ink, and optically variable devices in the identity document.

18 Claims, 4 Drawing Sheets

SCANNER WITH MULTISPECTRAL AUTHENTICATION SYSTEM

BACKGROUND

Field of the Invention

The embodiments described herein are generally directed to a document scanner, and, more particularly, to a scanner with a multispectral authentication system for automatically verifying and/or reading identity documents, such as passport and visa documents.

Description of the Related Art

Russian Utility Model No. 127 977 U1, issued on May 10, 2013, which is hereby incorporated herein by reference as if set forth in full, describes a universal scanner of passport and visa documents. The scanner comprises an optical scanner, including a camera and illuminators connected to a control device, and a radio frequency identification (RFID) reader connected to a USB hub. The scanner is characterized by a hold-down mechanism for holding down documents, and using an optical scanner, instead of a photosensor, to detect the presence of a document on the glass pane. However, this scanner is incapable of reading the holographic images that are present in modern identity documents. The present disclosure is directed to overcoming this and other problems discovered by the inventors.

SUMMARY

In an embodiment, a scanner comprises: a glass pane; a frame underlying the glass pane, wherein the frame comprises a frame body that defines an internal aperture, wherein a plurality of light emitting diodes (LEDs) are embedded within the frame body; a microprocessor configured to regulate an intensity of the plurality of LEDs embedded within the frame body; and an optical scanner configured to capture image data of a document on the glass pane. The frame body may be made of optically transparent material.

The optical scanner may comprise a camera that is configured to capture the image data while the microprocessor varies the intensity of the plurality of LEDs. The optical scanner may comprise a white illuminator configured to illuminate the glass pane from below with white light. The optical scanner may comprise an infrared illuminator configured to illuminate the glass pane from below with infrared light. The optical scanner may comprise an ultraviolet illuminator configured to illuminate the glass pane from below with ultraviolet light. The optical scanner may comprise a camera configured to capture image data of the document on the glass pane while the glass pane is illuminated by each of the white illuminator, the infrared illuminator, and the ultraviolet illuminator.

The scanner may further comprise a radio frequency identification (RFID) reader that is configured to read data from an integrated RFID chip in the document. The RFID reader may comprise a double-loop antenna.

The microprocessor may be affixed to an outer side of the frame body. The scanner may further comprise a wireless communication interface that is affixed to the outer side of the frame body and communicatively coupled to the microprocessor. The microprocessor may be configured to regulate the intensity of the plurality of LEDs according to commands received from a controller via the wireless communication interface.

The glass pane and the frame body may be rectangular, and the inner dimensions of the frame body may match outer dimensions of the glass pane. The frame body may be formed as a solid plate with the plurality of LEDs embedded into a surface of the solid plate at equidistant intervals. A geometric center of the internal aperture and a geometric center of the glass pane may be aligned along an axis that is perpendicular to a scanning plane of the glass pane on which the document is placed.

The scanner may further comprise a controller configured to automatically recognize one or more elements of the document in the image data. The one or more elements may comprise at least one element written or drawn in optically variable ink. The one or more elements may comprise at least one optically variable device.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The present description is directed to a scanner with a multispectral authentication system for automatically verifying and/or reading identity documents, such as passport and visa documents. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Figure 1:
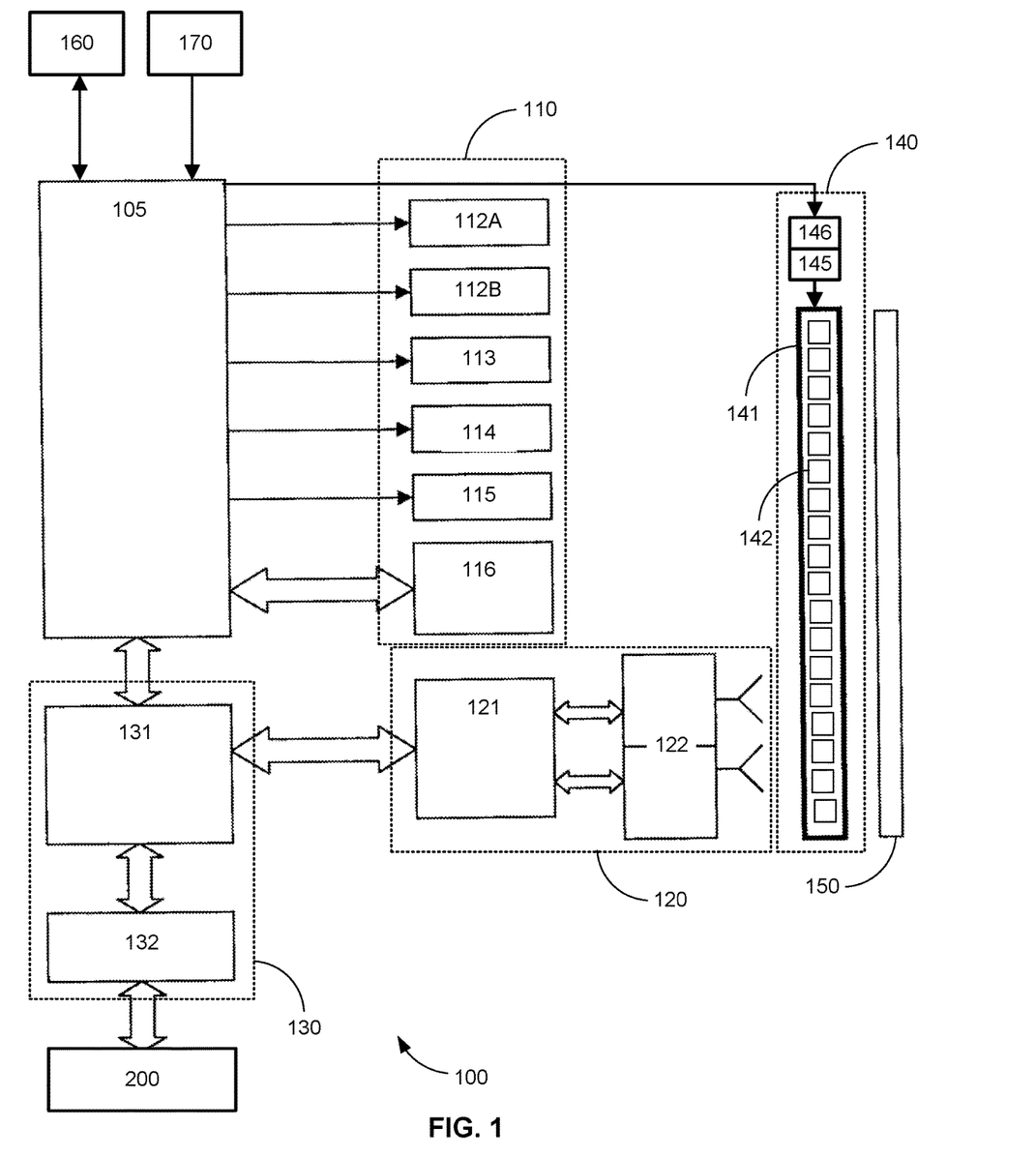
FIG. 1 illustrates data flow between components of a scanner, according to an embodiment.

FIG. 1 illustrates a data flow between components of a scanner 100, according to an embodiment. At a high level, scanner 100 may comprise a controller 105, an optical scanner 110, a radio frequency identification (RFID) reader 120, and a Universal Serial Bus (USB) subsystem 130, a frame 140, a glass pane 150, a display 160, and one or more physical buttons 170. Optical scanner 110, which is configured to capture image data of an identity document on glass pane 150, may comprise one or more operating mode indicators 112, an infrared (IR) illuminator 113, a white illuminator 114, an ultraviolet (UV) illuminator 115, and a camera 116. RFID reader 120 may comprise an RFID driver 121 and a double-loop antenna 122. USB subsystem 130 may comprise a USB hub 131 and a USB connector 132. Both optical scanner 110 and RFID reader 120 may be independent USB devices that are each communicatively coupled, by a wired or wireless connection, to USB hub 131.

Frame 140 may be fixed under glass pane 150, so as to underly glass pane 150, and comprise a frame body 141 that defines an internal aperture (not visible). Frame body 141 may be made of optically transparent material (e.g., glass). Frame 140 may comprise one or more, and generally a plurality of, light emitting diodes (LEDs) 142 that are embedded on or within frame body 141 and emit light under the control of a microprocessor 145. Both frame body 141 and the internal aperture may be rectangular. The inner dimensions of frame body 141, representing the outer dimensions of the internal aperture, may match (e.g., be equal or similar to) the dimensions (e.g., outer dimensions) of glass pane 150, which may also be rectangular. The internal aperture of frame 140, whose dimensions may match those of glass pane 150, ensures that frame 140 does not interfere with the illumination supplied by illuminators 113-115. The outer dimensions of frame body 141 may be defined such that the width of frame body 141 (i.e., between the inner and outer dimensions of frame body 141) is sufficient to accommodate LEDs 142. LEDs 142 may be spaced equidistantly apart around the entire frame body 141, to ensure uniform illumination of the entire scanning plane of glass pane 150 on which the identity document is placed. In an embodiment, frame body 141 is formed as a solid plate with a plurality of LEDs 142 embedded into a surface of the solid plate (e.g., the top surface of frame body 141, facing glass pane 150) at equidistant intervals. One possible embodiment of an LED 142 is disclosed in Russian Utility Model No. 115 890 U1, issued on May 10, 2012, which is hereby incorporated herein by reference as if set forth in full.

Microprocessor 145 may be affixed or mounted to an outer side of frame body 141, such that the presence of microprocessor 145 does not interfere with the operation of illuminators 113-115. In addition, a communication interface 146 may be affixed or mounted to the outer side of frame body 141, such that the presence of communication interface 146 does not interfere with the operation of illuminators 113-115. Communication interface 146 may be communicatively coupled to microprocessor 145. In an embodiment, communication interface 146 is a wireless communication interface that is configured to receive control signals from controller 105 over a wireless connection. Alternatively, communication interface 146 may be a wired communication interface that is configured to receive commands from controller 105 over a wired connection. In any case, controller 105 may transmit commands to microprocessor 145 via communication interface 146, and microprocessor 145 may receive the commands from controller 105 via communication interface 146.

Microprocessor 145 may be connected to all LEDs 142, and configured to regulate the intensity of the plurality of LEDs 142, for example, according to commands received from controller 105 via communication interface 146. In particular, microprocessor 145 may generate control signals LEDs 142 to change or otherwise adjust the intensity of the light emitted by LEDs 142. Microprocessor 145 may be configured to collectively control all LEDs 142 as a group, individually control each LED 142, independently of other LEDs 142, and/or control subsets of LEDs 142, independently of other subsets of LEDs 142.

LEDs 142 may emit only white light. In an alternative embodiment, LEDs 142 may be multispectral, such that LEDs 142 can emit a variety of wavelengths of light. For example, microprocessor 145 may collectively control all LEDs 142 to emit the same color of light in one of a plurality of possible colors, and be configured to change the color of the emitted light to another one of the plurality of possible colors. In other words, microprocessor 145 may vary the color of light that is emitted by LEDs 142. Alternatively, microprocessor 145 may individually control each LED 142 to emit one of a plurality of possible colors. In this case, microprocessor 145 may control one or more LEDs 142 to emit one color, while controlling one or more other LEDs 142 to emit a different color. In either case, microprocessor 145 may change the color or other wavelength of light emitted by LEDs 142, during scans and/or across scans. The utilization of multispectral LEDs 142 expands the ability of scanner 100 to recognize holographic images on identity documents.

Glass pane 150 may be designed such that the placement of an unfolded identity document on the scanning plane or top surface of glass pane 150 enables the identity document to be imaged by optical scanner 110 and an integrated RFID chip within the identity document to be read by RFID reader 120. Scanning and reading may begin automatically whenever a document is placed in the appropriate position and is immobilized on glass pane 150, as will be discussed elsewhere herein.

Controller 105 may comprise or be based on a field-programmable gate array (FPGA) or other type of integrated circuit (IC) that is configured to execute a hard-coded control program for optical scanner 110. Alternatively, controller 105 may comprise any other type of processing system configured to control optical scanner 110 either using a hard-coded control program or by executing control software. Controller 105 may be configured to transmit control signals to operating mode indicator(s) 112, IR illuminator 113, white illuminator 114, UV illuminator 115, and camera 116, as well as to microprocessor 145 of frame 140. In addition, controller 105 may be configured to receive image data from camera 116.

Each operating mode indicator 112 may comprise a light that indicates at least one operating mode of scanner 100. While two operating mode indicators 112, including a first operating mode indicator 112A and a second operating mode indicator 112B, are illustrated, it should be understood that optical scanner 110 may consist of any number of operating mode indicators 112, including a single operating mode indicator 112 or three or more operating mode indicators 112. Each operating mode indicator 112 may indicate a different operating mode when activated (e.g., to emit light), in which case the number of operating mode indicators 112 may be equal to the number of operating modes of scanner 100. For example, a first operating mode indicator 112A may turn on during scanning and off when not scanning, and a second operating mode indicator 112B may turn off during scanning and on when not scanning, under the control of controller 105. Each operating mode indicator 112A and 112B may have a different colored light than any other operating mode indicator 112. Alternatively, scanner 100 may consist of a single multi-mode indicator 112 that is capable of indicating each and every one of a plurality of operating modes of scanner 100 (e.g., by emitting a different color of light for each of the plurality of operating modes). In either case, different operating modes and/or the results of scanning may be indicated by differently colored light emitted from operating mode indicator(s) 112. Advantageously, a user may be informed about the operating mode of scanner 100 and/or the results of a scan by simply viewing operating mode indicator(s) 112, without having to open scanner 100 or interrupt scanning. One example of an operating mode indicator 112 is disclosed in Russian Utility Model No. 117 385 U1, issued on Jun. 27, 2012, which is hereby incorporated herein by reference as if set forth in full.

IR illuminator 113 is configured to illuminate glass pane 150 with IR light. In particular, IR illuminator 113 may be positioned within the housing of scanner 100 so as to illuminate the scanning plane of glass pane 150 from below (e.g., at an angle) with IR light. Camera 116 may be configured to capture image data of the identity document on glass plane 150, while glass pane 150 is illuminated by IR illuminator 113.

White illuminator 114 is configured to illuminate glass pane 150 with white light. In particular, white illuminator 114 may be positioned within the housing of scanner 100 so as to illuminate the scanning plane of glass pane 150 from below (e.g., at an angle) with white light. Camera 116 may be configured to capture image data of the identity document on glass plane 150, while glass pane 150 is illuminated by white illuminator 114.

UV illuminator 115 is configured to illuminate glass pane 150 with UV light. In particular, UV illuminator 115 may be positioned within the housing of scanner 100 so as to illuminate the scanning plane of glass pane 150 from below (e.g., at an angle) with UV light. Camera 116 may be configured to capture image data of the identity document on glass plane 150, while glass pane 150 is illuminated by UV illuminator 113.

Camera 116 may comprise a UV filter. UV security elements on pages of identity documents, such as passport and visa documents, when illuminated under UV light, have the property of secondary radiation in the visible part of the spectrum. With the UV filter in place, UV reflections are filtered out, such that camera 116 is able to see these security elements. In the absence of a UV filter, the UV reflections would reach camera 116 and thereby mask the UV security elements on the pages of the identity documents.

Camera 116 is configured to capture image data of the identity document on glass pane 150, while glass pane 150 is illuminated by each of IR illuminator 113, white illuminator 114, and UV illuminator 115, in succession. Camera 116 is further configured to capture the image data of the identity document while microprocessor 145 regulates the intensity of the plurality of LEDs 142 within frame body 141. In other words, the image data may comprise images of the identity document under each of IR illumination, white illumination, UV illumination, and illumination by LEDs 142 with varying intensity of glow.

RFID reader 120 is configured to read data from an integrated RFID chip in the identity document, without having to contact the identity document. RFID reader 120 may comprise an RFID driver 121 and a double-loop antenna 122. Each of the two loops in double-loop antenna 122 is configured to detect an RFID chip in one page of the identity document. This eliminates the need to change the orientation of the identity document in scanner 100. RFID reader 120 may normally operate in an RFID-chip-detection mode. In the RFID-chip-detection mode, the two antenna loops in double-loop antenna 122 are alternatingly connected to RFID driver 121, such that the circuit of the loop in which the RFID chip in the document is detected becomes active in double-loop antenna 122. The active loop may then read data from the RFID chip in the identity document. Advantageously, double-loop antenna 122 is able to read data from any RFID chip at any arbitrary location in the identity document, even when a sticker of conductive foil is used to shunt the electromagnetic field generated by RFID reader 120. RFID driver 121 may receive the read data from double-loop antenna 122, and transfer the read data to USB hub 131. This read data may comprise a machine-readable zone (MRZ) line, a photograph (e.g., of the owner of the identity document), biometric information (e.g., fingerprints) of the owner of the identity document, and/or the like.

Controller 105 may perform automated detection of an identity document on glass pane 150 using optical scanner 110 and RFID reader 120. For example, controller 105 may automatically control optical scanner 110 to begin scanning the identity document and acquire image data from camera 116, while RFID reader 120 may automatically begin detecting and reading an RFID chip in the identity document. Controller 105 may transfer the image data to USB subsystem 130, and RFID driver 121 may transfer the read data to USB subsystem 130. Controller 105 may acquire the read data from RFID driver 121 through USB hub 131.

USB subsystem 130 may comprise a USB hub 131 and a USB connector 132. USB hub 131 may receive the image data from controller 105 and the read data from RFID driver 121. USB hub 131 may combine the image data and the read data into a single USB data channel that is provided to a processing system 200 via USB connector 132. In particular, processing system 200 may be an external system that is communicatively connected to USB connector 132 via a USB cable. Alternatively, processing system 200 may be an external system that is communicatively connected to scanner 100 via a wireless connection. In this case, scanner 100 may comprise a wireless communication interface in addition to or instead of USB subsystem 130, and processing system 200 may have a corresponding wireless communication interface that connects to the wireless communication interface of scanner 100 to receive the image data and the read data via a wireless data channel. An example of a wireless communication interface is disclosed in Russian Patent No. 2 415 500 C1, issued on Mar. 27, 2011, which is hereby incorporated herein by reference as if set forth in full.

Scanner 100 may be a universal device that is configured to work with an external system, such as processing system 200, via a physical connection to USB subsystem 130 or a wireless connection via a wireless communication interface. Processing system 200 may programmatically control scanner 100, including the scanning by optical scanner 110 and the reading by RFID reader 120. For example, processing system 200 may execute control software that enables a user to set scanning modes, backlight modes, and/or the like, as well as view the image data of the identity document, captured by optical scanner 110, and/or view the read data of the identity document, read by RFID reader 120 from an RFID chip of the identity document. Processing system 200 may also execute control software to initiate an automated multispectral authentication process in scanner 100.

Scanner 100 may comprise a display 160. Display 160 may be configured to display information, including the results of a current scan of an identity document, under the control of controller 105. In an embodiment, display 160 is a touch-panel display capable of both displaying information and receiving inputs via a graphical user interface displayed on display 160. In this case, a user may utilize the user's finger or a stylus to interact with virtual buttons in the graphical user interface, type information into the graphical user interface (e.g., using a virtual keyboard), and/or the like. Examples of display 160 are disclosed in Russian Patent Nos. 2 749 061 C1, issued on Jun. 3, 2021, and 2 748 559 C2, issued on May 26, 2021, which are both hereby incorporated herein by reference as if set forth in full.

Scanner 100 may comprise one or more physical buttons 170. In an embodiment, there are at least two physical buttons 170. For instance, a first physical button 170 may be a confirmation button that enables a user to confirm that scanned information (e.g., displayed on display 160) is correct, and a second physical button 170 may be a rejection button that enables a user to indicate that scanned information (e.g., displayed on display 160) is incorrect. In addition, one of these or a third physical button 170 may enable a user to manually start a scan, for example, to start a rescan of an identity document (e.g., without having to remove the identity document from scanner 100) in the event of a malfunction of the automated scanning. One example of a physical button 170 is disclosed in Russian Patent No. 2 620 870 C2, issued on May 30 2017, which is hereby incorporated herein by reference as if set forth in full. In an alternative embodiment, all inputs may be provided virtually via display 160, as a touch-panel display, in which case physical button(s) 170 may be omitted.

Figure 2:
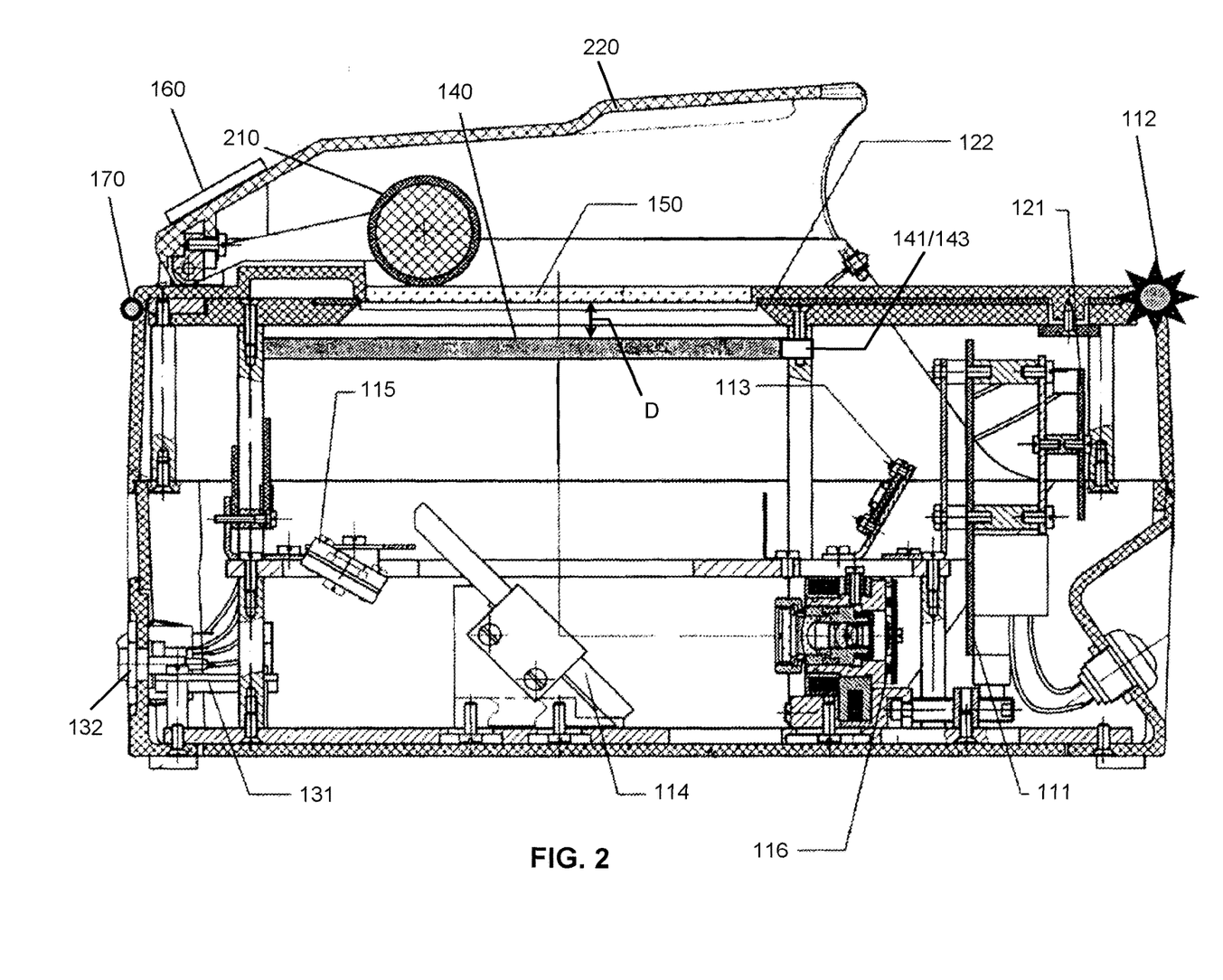
FIG. 2 illustrates a schematic of a scanner, according to an embodiment.

FIG. 2 illustrates a schematic of a scanner 100, according to an embodiment. Scanner 100 may comprise a power connector (e.g., on a back wall of the housing of scanner 100) for connecting a power supply to scanner 100. In addition, scanner 100 may comprise a power tumbler switch (e.g., on a rear panel of the housing of scanner 100) for turning scanner 100 on and off.

As illustrated, frame 140 is positioned within the interior of the housing of scanner 100 at a distance D beneath glass pane 150. The distance D between frame body 141 and glass pane 150 may be fixed or adjustable. Frame body 141 may be fixed to the housing of scanner 100, such that the geometric center of the internal aperture of frame 140 and the geometric center of glass pane 150 are aligned on the same axis, perpendicular to the scanning plane of glass pane 150. This alignment ensures uniformity of illumination of the scanning plane of glass pane 150 on which the identity document is placed.

Frame 140 with the embedded LEDs 142 enables optical scanner 110 to capture holographic elements present in identity documents. In particular, when LEDs 142 are activated by microprocessor 145, an identity document on glass pane 150 is illuminated from all sides by the light (e.g., white or multispectral light) emitted by LEDs 142. Camera 116 may capture the image data as microprocessor 145 varies the intensity of the light emitted by LEDs 142. This enables camera 116 to capture image data comprising each holographic image in the identity document.

The combination of IR illuminator 113, white illuminator 114, UV illuminator 115, and LEDs 142 forms a multispectral authentication system for verifying the authenticity of scanned identity documents. Illumination of glass pane 150 with each of illuminators 113-115 and with LEDs 142 may be carried out sequentially or successively, so as not to create interference between illuminators 113-115 and LEDs 142. In particular, controller 105 may controller each illuminator 113-115 and microprocessor 145, such that only one of IR illuminator 113, white illuminator 114, UV illuminator 115, and LEDs 142 are active at any given time. In addition, the intensity of LEDs 142 may be adjustable, such that controller 105 is able to regulate the intensity of the glow of LEDs 142, via microprocessor 145, during illumination by LEDs 142. An example of a method of regulating the intensity of LEDs, such as LEDs 142, is disclosed in Russian Patent No. 2 687 280 C1, issued on May 13, 2019, which is hereby incorporated herein by reference as if set forth in full.

Scanner 100 may comprise a hold-down mechanism 210, which is configured to fix the identity document to glass pane 150 to ensure immobility of the identity document during scanning. In addition, hold-down mechanism 210 may press the identity document to glass pane 150 to ensure proper adherence of the identity document to glass pane 150 and eliminate glares in the image data that may otherwise be caused by bumps on the laminated surface of the identity document being scanned. As an example, hold-down mechanism 210 may comprise or consist of a spring-loaded pressure roller that is biased towards glass pane 150, such that it presses down on the identity document from above, while the identity document is sandwiched between glass pane 150 and hold-down mechanism 210. The spring-loading enables hold-down mechanism 210 to fix identity documents of various thickness to glass pane 150. The spring-loaded pressure roller may be mounted on glass pane 150 by brackets, such that identity documents of varying thickness may be clamped between the spring-loaded pressure roller and glass pane 150 without having to lift the spring-loaded pressure roller.

Scanner 100 may comprise a lid 220 that fully encloses glass pane 150 and hold-down mechanism 210 with an identity document sandwiched therebetween. It should be understood that lid 220 may be hinged, such that it can be lifted in order to place an identity document on glass pane 150, and lowered to provide a uniformly dark background during scanning of the identity document. In other words, lid 220 prevents external light from reaching the identity document during scanning. Display 160 may be positioned on lid 220 or at another position on the exterior of the housing of scanner 100.

Figure 3:
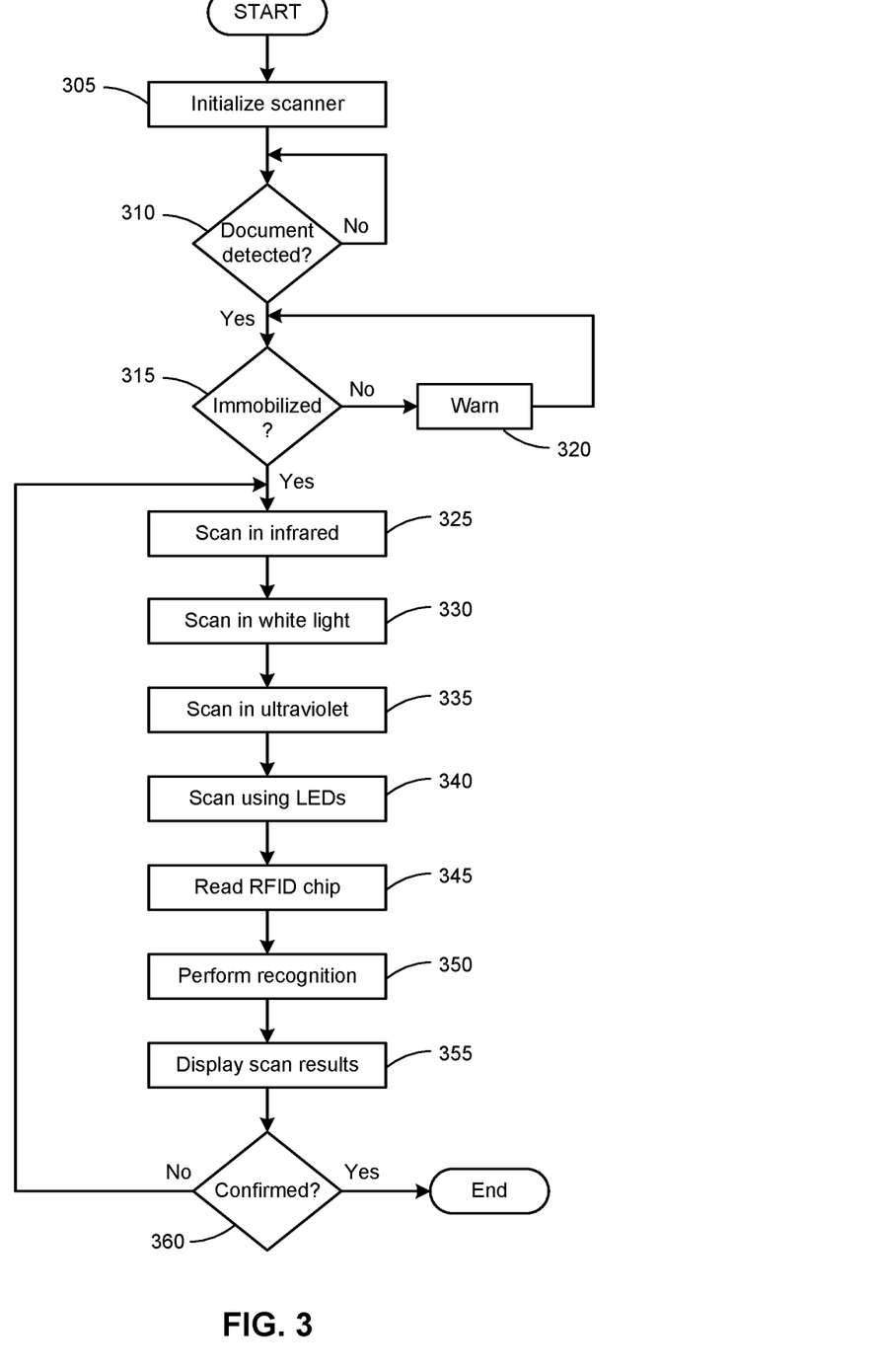
FIG. 3 illustrates a control process for a scanner, according to an embodiment.

FIG. 3 illustrates a control process 300 for scanner 100, according to an embodiment. Process 300 represents an automated multispectral authentication process. Process 300 may be initiated in response to a user operation (e.g., via display 160 and/or physical button(s) 170), and executed as a control program, implemented in hardware and/or software, by controller 105. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 305, scanner 100 may be initialized. Initialization may comprise setting IR illuminator 113, white illuminator 114, UV illuminator 115, camera 116, LEDs 142, and/or other components of scanner 100 to an initial state. The initial state of a component may be a default state or a state specified by processing system 200 (e.g., via one or more settings).

In subprocess 310, it is determined whether or not a document has been detected. Controller 105 may automatically attempt to detect the presence and position of a document on glass pane 150 from real-time image data captured by camera 116. This eliminates the need for scanner 100 to comprise a photosensor, and allows a more accurate determination of the document's position on glass pane 150. When a document has been detected (i.e., "Yes" in subprocess 310), process 300 proceeds to subprocess 315. Otherwise, when no document has been detected (i.e., "No" in subprocess 310), continues to wait for a document to be detected.

In subprocess 315, it is determined whether or not the detected document has been immobilized. Again, controller 105 may automatically determine whether or not the document on glass pane 150 is moving based on real-time image data captured by camera 116. For example, a change in position between frames in the image data indicates that the document has not been immobilized, whereas the absence of any change in position over consecutive frames in the image data (e.g., a certain number of frames, representing a certain time period) indicates that the document has been immobilized. Optionally, if the position of the document is rotated relative to glass pane 150 by more than an acceptable threshold degree (e.g., more than 3°), the document may also be determined to not be immobilized. When the detected document has not been immobilized (i.e., "No" in subprocess 315), process 300 may proceed to subprocess 320. Otherwise, when the detected document has been immobilized (i.e., "Yes" in subprocess 315), process 300 proceeds to subprocess 325 to begin optical scanning in at least three backlight modes (e.g., infrared, white, and ultraviolet).

In subprocess 320, a warning may be issued. In particular, a message may be displayed on display 230 that prompts the user to stop moving or otherwise immobilize the document, rotate or otherwise align the document, and/or the like. Then, process 300 may return to subprocess 315 to again determine whether or not the document has been immobilized.

In subprocess 325, the document may be scanned while IR illuminator 113 is controlled by controller 105 to illuminate glass pane 150 with IR light. In particular, IR illuminator 113 may be activated to emit IR light towards glass pane 150. Camera 116 then generates image data of the document illuminated by the IR light.

In subprocess 330, the document may be scanned while white illuminator 114 is controlled by controller 105 to illuminate glass pane 150 with white light. In particular, white illuminator 114 may be activated to emit white light towards glass pane 150. Camera 116 then generates image data of the document illuminated by the white light.

In subprocess 335, the document may be scanned while UV illuminator 115 is controlled by controller 105 to illuminate glass pane 150 with UV light. In particular, UV illuminator 115 may be activated to emit UV light towards glass pane 150. Camera 116 then generates image data of the document illuminated by the UV light. As discussed elsewhere herein, camera 116 may comprise a UV filter, such that the image data comprise the secondary radiation from the document without reflected UV light.

In subprocess 340, the document may be scanned while LEDs 142 are controlled by microprocessor 145 to illuminate glass pane 150 from all sides. In particular, controller 105 may send instructions to microprocessor 145, which may control LEDs 142 to regulate (e.g., vary or otherwise adjust) the intensity of light being supplied to glass pane 150 while the image data are captured by camera 116. As discussed elsewhere herein, the light, emitted by LEDs 142, may be white light or some other wavelength of light.

In subprocess 345, data may be read by RFID reader 120 from an RFID chip in the document. In particular, as discussed elsewhere herein, double-loop antenna 122 may detect the RFID chip and read data from the RFID chip. This read data may comprise an MRZ line, a photograph (e.g., of the owner of the identity document), biometric information (e.g., fingerprints) of the owner of the identity document, and/or the like.

In subprocess 350, controller 105 may perform recognition based on the image data, acquired by camera 116 in subprocesses 325-340, and the read data, acquired by RFID reader 120 in subprocess 345. For instance, controller 105 may pre-process the image data. This pre-processing may comprise compensating for a rotation angle (e.g., up to 3°) of the document in the image data. In addition, controller 105 may recognize the type of identity document (e.g., based on a layout, holographic elements, optically variable ink (OVI), optically variable devices (OVDs), and/or other elements within the document, etc.) in the image data. Recognition of the document type may enable controller 105 to automatically identify the location of elements (e.g., fields, holographic, OVI, or OVD elements) based on a known layout for the document type. Thus, controller 105 may perform optical character recognition or other recognition on these elements of the document in the image data to determine the values of one or more, and potentially all, fields (e.g., including the MRZ line) in the identity document, identify the area of a photograph in the identity document, and/or the like. Controller 105 may also validate the recognized fields against the read data, acquired by RFID reader 120. For example, controller 105 may validate the data by comparing the MRZ line and/or other data in the recognized fields to the MRZ line and/or other data in the read data. If the data match, the identity document has passed validation. Otherwise, if the data do not match, the identity document has failed validation. It should be understood that this data may identify the owner of the identity document, as well as potentially provide other information about the owner of the identity document.

In an embodiment, controller 105 is configured to recognize elements written or drawn in optically variable ink (OVI). Optically variable ink is a color-variable printing ink that changes color depending on the viewing angle. The ink itself is transparent, and the effect is achieved by the refraction of light through the transparent ink. Controller 105 may recognize OVI elements by regulating the intensity of LEDs 142, via control signals to microprocessor 145 to change the intensity of LEDs 142 over time.

In an embodiment, controller 105 is configured to recognize optically variable devices (OVDs). Optically variable devices are iridescent or non-iridescent security elements that display various information, such as movement or color changes, depending on the viewing and/or lighting conditions. The changes in appearance, when rotating and tilting an optically variable device, is reversible, predictable, and reproducible. OVD elements are based on diffractive optical structures, and are used as security devices and anti-counterfeiting measures on banknotes, government-issued identity documents, credit cards, and the like. Controller 105 may recognize OVD elements by regulating the intensity of LEDs 142, via control signals to microprocessor 145 to change the intensity of LEDs 142 over time.

In an embodiment, display 160 could be configured to receive information, such as a handwritten signature. In this case, a user could have the owner of the identity document sign display 160 (e.g., using a stylus). This signature may then be compared to a signature recognized from the image data and/or in the read data of the identity document, to verify the authenticity of the owner's signature with respect to the signature in the identity document.

In subprocess 355, controller 105 may display the results of the scan, including the image data, the read data, and/or the recognition results, on display 160. For example, display 160 may display a graphical user interface that includes the photograph of the owner of the identity document (e.g., from the read data), along with information obtained during the recognition process (e.g., to the right of the photograph). This information may comprise the identity of the owner of the identity document (e.g., name, etc., provided in the MRZ line), image data acquired in one or more, including potentially all of, subprocesses 325, 330, 335, and/or 340, a conclusion about whether the data has been validated (i.e., fields in the image data match the corresponding fields in the read data), any problems arising during the scanning and/or validation processes, and/or the like. If any problems arose, the user may be prompted to initiate a rescan of the identity document, either via a virtual button within the graphical user interface or a physical button 170.

In subprocess 360, it is determined whether or not the recognition results are confirmed. In particular, the user may view the information displayed on display 160 in subprocess 355. The user may then press a first one of physical buttons 170 or select a first virtual button on display 160 if the information is correct, or press a second one of physical buttons 170 or select a second virtual button on display 160 if the information is incorrect. Whether physical or virtual, the first button may be labeled with "Information is correct" or similar text, whereas the second button may be labeled with "Information is incorrect, clarification is required" or similar text. When the recognition results are confirmed (i.e., "Yes" in subprocess 360), for example, by the user pressing the first button, process 300 may end. In this case, display 160 may be cleared. Otherwise, when the recognition results are not confirmed or are rejected (i.e., "No" in subprocess 360), for example, by the user pressing the second button, process 300 may initiate a rescan by returning to subprocess 325. Alternatively, when initiating a rescan, process 300 could return to subprocess 305, 310, or 315. Notably, the rescan may be performed without having to lift lid 220 and/or remove the identity document from glass pane 150.

If any problems arise during process 300 or the scan is not successfully completed, process 300 may be repeated in an extended, step-by-step, manual mode that allows user intervention during the rescan (e.g., after each subprocess). This manual mode may be launched by user selection of a corresponding physical button 170 or virtual button on display 160 at any stage of the automated scan. In this case, the manual mode could be launched from the start, instead of as a rescan after an automated scan. When the manual mode is not available, the button may be rendered inoperative (e.g., if physical or virtual) or invisible (e.g., if virtual).

Figure 4:
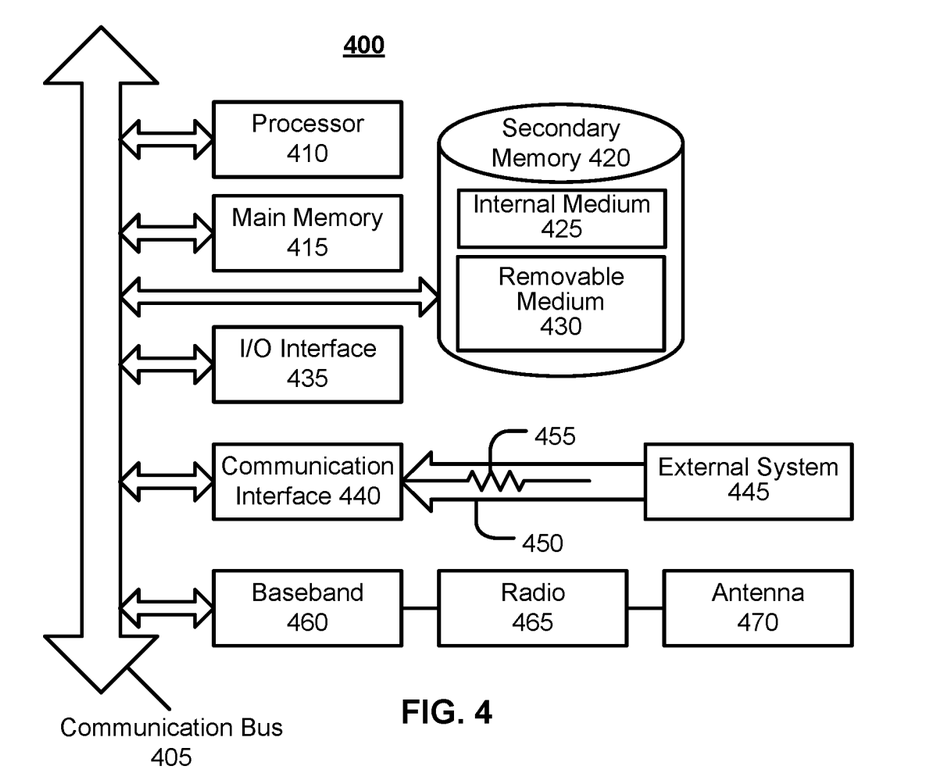
FIG. 4 illustrates an example processing system, by which one or more of the processes described herein may be executed, according to an embodiment.

FIG. 4 is a block diagram illustrating an example wired or wireless system 400 that may be used in connection with various embodiments described herein. In particular, system 400 may represent an implementation of controller 105, microprocessor 145, processing system 200, and/or any other processing device described herein. System 400 can be any processor-enabled device that is capable of wired or wireless data communication. Other processing systems and/or architectures may also be used, as will be clear to those skilled in the art.

System 400 may comprise one or more processors 410. Processor(s) 410 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 410. Examples of processors which may be used with system 400 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 410 may be connected to a communication bus 405. Communication bus 405 may include a data channel for facilitating information transfer between storage and other peripheral components of system 400. Furthermore, communication bus 405 may provide a set of signals used for communication with processor 410, including a data bus, address bus, and/or control bus (not shown). Communication bus 405 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 400 may comprise main memory 415. Main memory 415 provides storage of instructions and data for programs executing on processor 410, such as one or more of the functions and/or modules discussed herein. It should be understood that programs stored in the memory and executed by processor 410 may be written and/or compiled according to any suitable language, including without limitation C/C++, Java, JavaScript, Perl, Python, Visual Basic, .NET, and the like. Main memory 415 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 400 may comprise secondary memory 420. Secondary memory 420 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 400. The computer software stored on secondary memory 420 is read into main memory 415 for execution by processor 410. Secondary memory 420 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 420 may include an internal medium 425 and/or a removable medium 430. Internal medium 425 and removable medium 430 are read from and/or written to in any well-known manner. Internal medium 425 may comprise one or more hard disk drives, solid state drives, and/or the like. Removable storage medium 430 may be, for example, a magnetic tape drive, a compact disc (CD) drive, a digital versatile disc (DVD) drive, other optical drive, a flash memory drive, and/or the like.

System 200 may comprise an input/output (I/O) interface 435. I/O interface 435 provides an interface between one or more components of system 400 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., display 160).

System 400 may comprise a communication interface 440. Communication interface 440 allows software to be transferred between system 400 and external devices (e.g. printers), networks, or other information sources. For example, computer-executable code and/or data may be transferred to system 400, over one or more networks (e.g., including the Internet), from a network server via communication interface 440. Examples of communication interface 440 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 400 with a network or another computing device. Communication interface 440 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 440 is generally in the form of electrical communication signals 455. These signals 455 may be provided to communication interface 440 via a communication channel 450 between communication interface 440 and an external system 445. In an embodiment, communication channel 450 may be a wired or wireless network, or any variety of other communication links. Communication channel 450 carries signals 455 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 415 and/or secondary memory 420. Computer-executable code can also be received from an external system 445 via communication interface 440 and stored in main memory 415 and/or secondary memory 420. Such computer-executable code, when executed, enable system 400 to perform the various functions of the disclosed embodiments as described elsewhere herein.

In an embodiment that is implemented using software, the software may be stored on a computer-readable medium and initially loaded into system 400 by way of removable medium 430, I/O interface 435, or communication interface 440. In such an embodiment, the software is loaded into system 400 in the form of electrical communication signals 455. The software, when executed by processor 410, preferably causes processor 410 to perform one or more of the processes and functions described elsewhere herein.

System 400 may comprise wireless communication components that facilitate wireless communication over a voice network and/or a data network (e.g., in the case of a mobile device, such as a smart phone). The wireless communication components comprise an antenna system 470, a radio system 465, and a baseband system 460. In system 400, radio frequency (RF) signals are transmitted and received over the air by antenna system 470 under the management of radio system 465.

In an embodiment, antenna system 470 may comprise one or more antennae and one or more multiplexors (not shown) that perform a switching function to provide antenna system 470 with transmit and receive signal paths. In the receive path, received RF signals can be coupled from a multiplexor to a low noise amplifier (not shown) that amplifies the received RF signal and sends the amplified signal to radio system 465.

In an alternative embodiment, radio system 465 may comprise one or more radios that are configured to communicate over various frequencies. In an embodiment, radio system 465 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 465 to baseband system 460.

Baseband system 460 is communicatively coupled with processor(s) 410, which have access to memory 415 and 420. Thus, software can be received from baseband processor 460 and stored in main memory 410 or in secondary memory 420, or executed upon receipt. Such software, when executed, can enable system 400 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A scanner comprising:
a glass pane;
a frame underlying the glass pane, wherein the frame comprises a frame body that comprises an internal aperture, wherein a plurality of light emitting diodes (LEDs) are embedded within the frame body, and wherein the frame body is formed as a solid plate with the plurality of LEDs embedded into a surface of the solid plate around an entirety of the frame body;
an optical scanner configured to capture image data of a document on the glass pane; and
a microprocessor configured to vary an intensity of the plurality of LEDs embedded within the frame body while the optical scanner captures image data of the document on the glass pane.

2. The scanner of claim 1, wherein the frame body is made of optically transparent material.

3. The scanner of claim 1, wherein the optical scanner comprises a camera that is configured to capture the image data while the microprocessor varies the intensity of the plurality of LEDs.

4. The scanner of claim 1, wherein the optical scanner comprises a white illuminator configured to illuminate the glass pane from below with white light.

5. The scanner of claim 4, wherein the optical scanner comprises an infrared illuminator configured to illuminate the glass pane from below with infrared light.

6. The scanner of claim 5, wherein the optical scanner comprises an ultraviolet illuminator configured to illuminate the glass pane from below with ultraviolet light.

7. The scanner of claim 6, wherein the optical scanner comprises a camera configured to capture image data of the document on the glass pane while the glass pane is illuminated by each of the white illuminator, the infrared illuminator, and the ultraviolet illuminator.

8. The scanner of claim 1, further comprising a radio frequency identification (RFID) reader that is configured to read data from an integrated RFID chip in the document.

9. The scanner of claim 8, wherein the RFID reader comprises a double-loop antenna.

10. The scanner of claim 1, wherein the microprocessor is affixed to an outer side of the frame body.

11. The scanner of claim 10, further comprising a wireless communication interface that is affixed to the outer side of the frame body and communicatively coupled to the microprocessor.

12. The scanner of claim 11, wherein the microprocessor is configured to vary the intensity of the plurality of LEDs according to commands received from a controller via the wireless communication interface.

13. The scanner of claim 1, wherein the glass pane and the frame body are rectangular, and wherein inner dimensions of the frame body match outer dimensions of the glass pane.

14. The scanner of claim 1, wherein the plurality of LEDs are embedded into the surface of the solid plate at equidistant intervals.

15. The scanner of claim 1, wherein a geometric center of the internal aperture and a geometric center of the glass pane are aligned along an axis that is perpendicular to a scanning plane of the glass pane on which the document is placed.

16. The scanner of claim 1, further comprising a controller configured to automatically recognize one or more elements of the document in the image data.

17. The scanner of claim 16, wherein the one or more elements comprise at least one element written or drawn in optically variable ink.

18. The scanner of claim 16, wherein the one or more elements comprise at least one optically variable device.

* * * * *